Oct. 23, 1934.  E. A. FORD  1,978,017
SLICING MACHINE
Filed Nov. 3, 1928    5 Sheets-Sheet 2
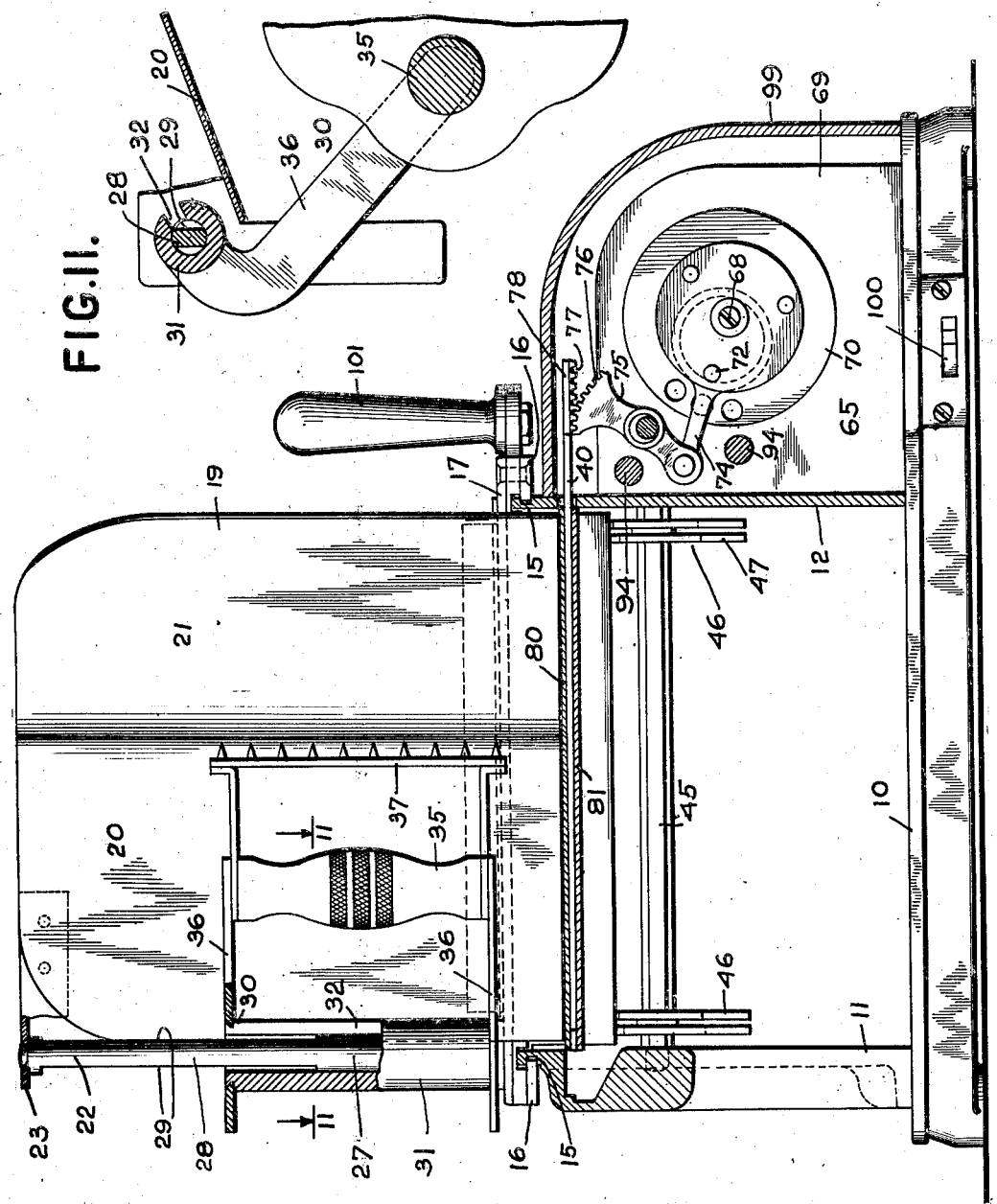

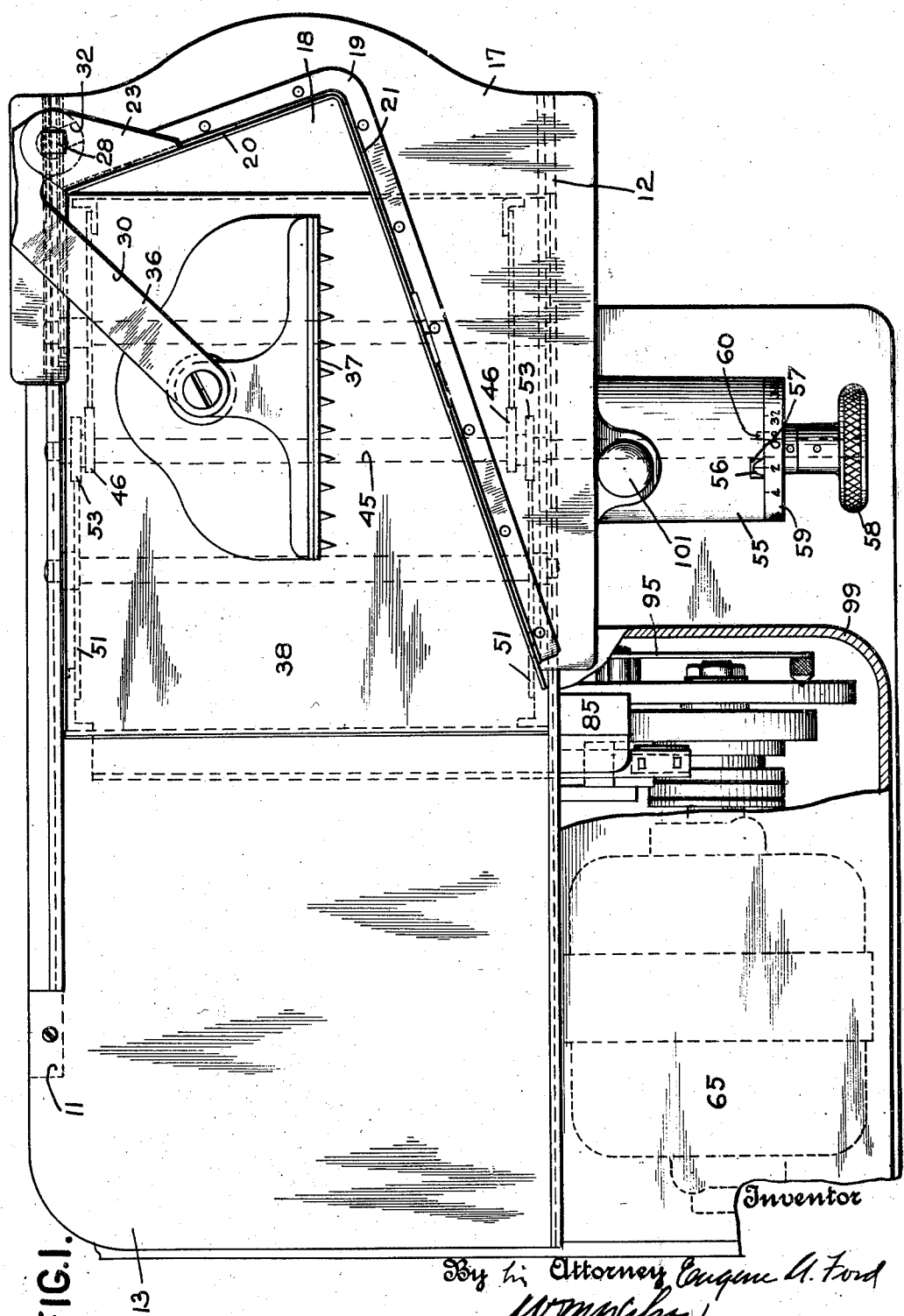

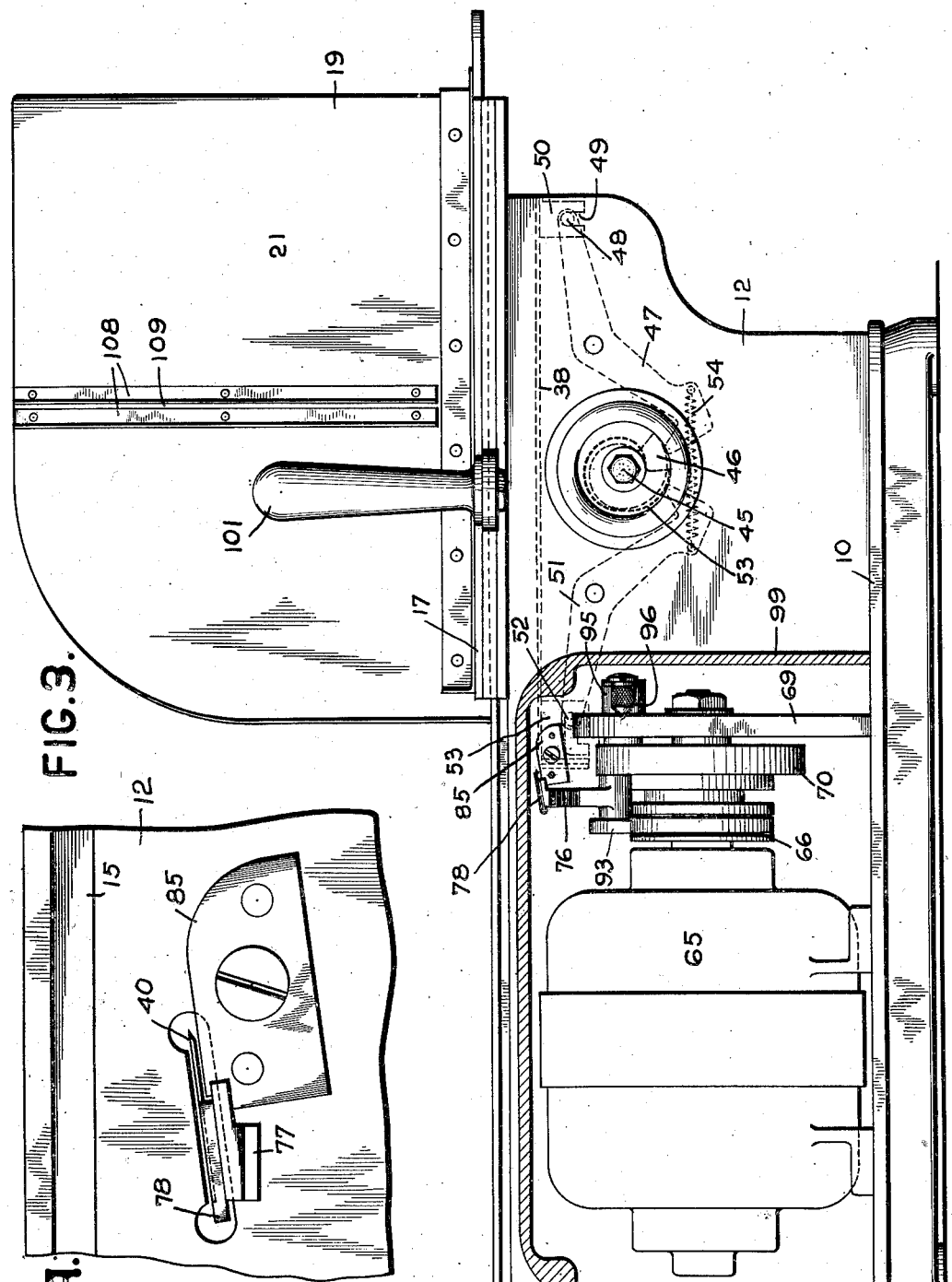

Oct. 23, 1934.   E. A. FORD   1,978,017
SLICING MACHINE
Filed Nov. 3, 1928   5 Sheets-Sheet 4
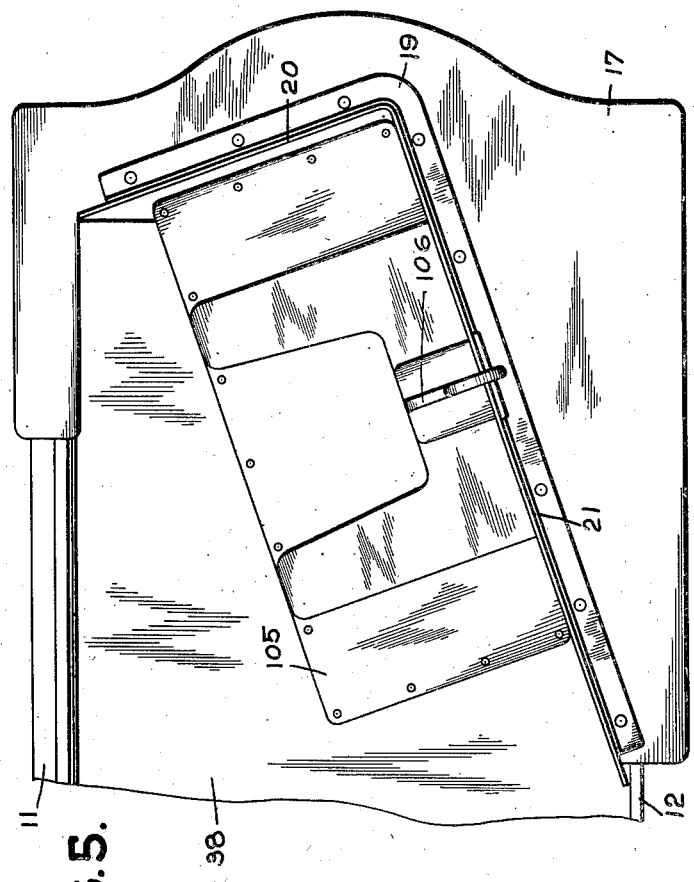
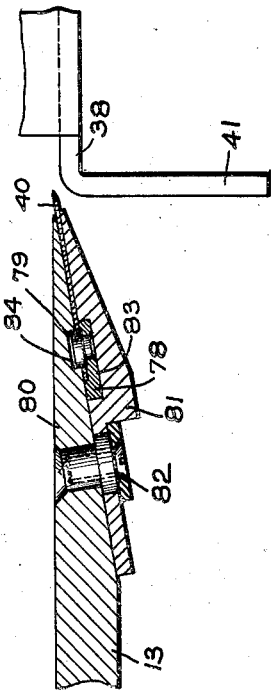
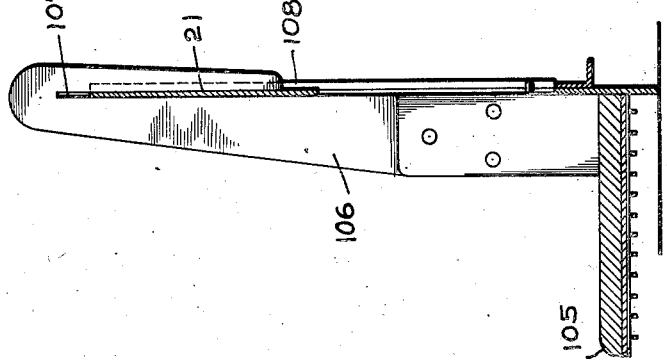
Inventor
Eugene A. Ford
By his Attorney
WM Wilson

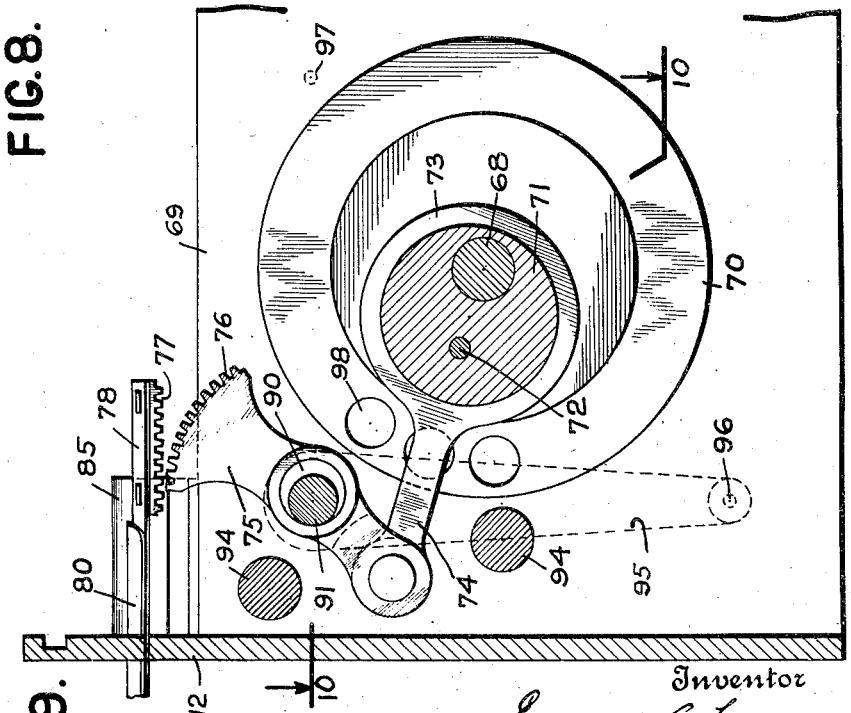

Patented Oct. 23, 1934

1,978,017

UNITED STATES PATENT OFFICE 1,978,017

SLICING MACHINE

Eugene A. Ford, Scarsdale, N. Y., assignor, by mesne assignments, to International Business Machines Corporation, New York, N. Y., a corporation of New York Application November 3, 1928, Serial No. 316,942

3 Claims. (Cl. 146—151)

This case relates to food slicing machines particularly for slicing meat such as bologna or similar provisions and is an improvement on the device disclosed in copending application, Serial No. 243,496, filed December 30, 1927.

In the use of a reciprocating slicing knife, as in the present case, the reversals of motion of the knife and its coacting driving members tend to cause noise and vibration. It is an object of this invention to provide means for reducing the noise and vibration to a minimum. More specifically, the object of this invention is to provide a driving device for the knife which will have its center of gravity coincident with its center of motion thereby providing a balanced driving mechanism which in conjunction with the horizontal positioning of the knife permits of a smoother driving operation in which the forces of gravity aid in overcoming the forces of inertia due to reversals of motion.

Another object of the invention is to provide an improved driving connection between the knife and its driving member.

Still another object is to provide novel means for releasing said driving connection to permit the knife to be removed.

A further object is to provide a novel meat holder whereby a piece of meat such as a slab of bacon may be held to be cut on a bias by the knife, providing an easy shear cut.

Still further, an object of the invention is to provide improved and manual means for feeding the meat holder relative to the knife.

A further object is to provide a novel clamping means for clamping the meat in the holder and to provide novel means for removal of the clamping means from the holder.

Other objects are to provide a novel clamp for the end piece of meat and a novel knife blade and carrier therefor.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a top plan view of the machine;

Fig. 2 is a front elevational view of the machine, partly sectioned;

Fig. 3 is a side elevational view of the machine, partly sectioned;

Fig. 4 is a detail view of the knife holder and the guide bearing therefor;

Fig. 5 is a top detail view of the end clamp applied to the meat holder;

Fig. 6 is a detail of said end clamp;

Fig. 7 is a detail of the knife guiding means and the adjacent edge of the meat supporting table;

Fig. 8 is a detail of the knife and its holder;

Fig. 9 is a detail of the knife actuating means;

Fig. 10 is a section on line 10—10 of Fig. 9;

Fig. 11 is a section on line 11—11 of Fig. 2.

In detail, referring to Figs. 1, 2, and 3, the machine comprises a base 10 on which is supported a pair of vertical parallel standards 11 and 12. Secured to the top of the standards at the front end of the machine is a horizontally disposed plate 13. The standards 11 and 12 are provided on their outside surfaces near their upper edges with guide slots 14 and 15, respectively, cooperating with similar guide flanges 16 at each side of a horizontal plate 17 formed with a slot 18 open at the front and having two sides in the rear which are disposed at an angle to the aforesaid parallel flanges 16 rigid with the plate 17.

Riveted, or secured in any other desired manner to the top of plate 17 along the sides of the slot 18 is an open meat holder chute 19 having vertical sides 20 and 21 coincident with and extending upwardly from the sides of said slot 18. A vertically disposed post 22 is fixed to and between the plate 17 and a bracket 23 attached to the chute side 20. The lower portion 27 of the post is circular in cross-section while the upper portion 28 is cut away to provide flat parallel vertically disposed sides 29 for a purpose to be hereinafter made clear. A meat clamp support 30 is slidably mounted on the post by means of a collar 31 fitting over the post. The inside of the collar is circular to fit the circular cross-section of portion 27 of the post. By reference to Fig. 11 it will be seen that collar 31 has a slot 32 cut therein which is wide enough to permit the passage therethrough of the portion 28 of the post. When the clamp support is raised to its uppermost position and swung outwardly clockwise (as viewed in Fig. 11) until the sides of slot 32 are in line with the sides 29 of portion 28 of the post, the support may be slipped off the post, the slot 32 passing over the portion 28. In a similar manner, the support may be slipped onto the post and by turning or lowering it slightly will be retained on the post. To manipulate the clamp, a handle 35 is revolubly journalled between the upper and lower plates 36 of the clamp. Fixed to the handle for rotation therewith is the clamp proper provided with the toothed gripping plate 37. The clamp plate may be turned to any angle desired. Thus it may be disposed to grip a piece of meat resting against either plate 20 or 21 of the chute 19 or in the corner of the latter. In cutting a slab of bacon, the latter is placed with its long side against the plate 21 and is clamped thereto by plate 37 so that the knife will cut the bacon on a bias, providing an easy shearing cut.

The meat rests on top of a horizontal table 38 (Figs. 1, 3, 5, and 7) which is adjustable vertically to permit slices of different thicknesses to be cut from the bottom of the piece of meat by the knife blade 40 disposed at a slight angle to the horizontal. Fig. 7 illustrates how the distance between the knife edge of blade 40 and the edge of table 38 determines the thickness of the slice cut off. The depending extension 41 of table 38 guides the slice of meat as it is being cut. A pan may be placed on the base 10 to receive the meat when it drops from the knife.

The means for adjusting the height of table 38 comprises a hexagonal shaft 45 rotatably mounted between the standards 11 and 12 below the table. A pair of like cams 46 approximately spiral shaped are located at opposite ends of the shaft and fixed thereto. Each of a pair of parallel, like levers 47 extending to the right (as seen in Fig. 3) is pivoted intermediately and has its forward end engaging the cam surfaces of cams 46. The rear ends of levers 47 are provided with pins 48 seated in notches 49 of brackets 50 attached to the bottom of table 38 at the right end thereof. Similar levers 51, one at each side of the machine, extending to the left have their rear ends provided with pins 52 coacting with slotted brackets at the left end of the table 38. The forward ends of the levers 51 rest on like spiral cams 53 fixed to shaft 45. A spring 54 is fixed to each lower end of a pair of adjacent levers 47 and 51 urging the levers toward each other and into yielding engagement with their respective cams.

Extending from plate 12 is a fixed hub 55 adapted to serve as a bearing for the shaft 45 and provided with an index mark 56 and a stop lug 57. The end of shaft 45 projects from hub 55 and has a knob 58 pinned thereto. The knob is provided with an index wheel 59 having numbers inscribed thereon representing different thicknesses of slice to be cut. To prevent the index wheel 59 being rotated past the zero point, the wheel is provided with a lug 60 to abut stop 57 when in zero position.

The rotation of shaft 45 by means of knob 58 will turn cams 46 and 53 which through coaction with levers 47 and 51 will raise or lower the table 38 to provide for a thickness of slice shown on the index wheel 59.

To the right of standard 12, the base 10 carries a motor 65 having a flexible clutch connection through disk 66 and leather washers 67 with a knife driving assembly comprising a stub shaft 68 fixed at one end in a standard 69, a flywheel 70 rotatably mounted on said stub shaft and an eccentric disk 71 fixed to the flywheel by a screw 72, and directly driven from the flexible clutch connection of the motor. An eccentric sleeve 73 embraces said disk 71 and is oscillated thereby. Arm 74 extending from the eccentric sleeve 73 is pivoted to the lower end of a lever 75 which has at its upper end a segmental rack 76 for cooperating with a rack 77 fixed to the right hand end of a knife holder 78. The knife holder has disposed along its length a number of pins 79 which serve to locate and hold the knife blade 40 against displacement laterally. The blade similar to a safety razor blade may be lifted off the pins to remove it from the holder. The previously mentioned plate 13 which is rigid with standards 11 and 12 terminates at its forward end, adjacent the adjustable table 38 in a triangular portion 80 the bottom of which is inclined upwardly. A substantially triangular guide plate 81 (Fig. 7) is fixed by screws 82 to the portion 80 and has a guide slot 83 in which the body of the knife holder 78 is seated. Forwardly of the guide slot 83 the plate 81 is spaced from the bottom of portion 80 to provide a path for the blade 40. The heads of pins 79 are accommodated in a recess 84 formed in the bottom of portion 80. To properly guide the rack 77 attached to the knife holder a bearing block 85 is fastened to the standard 12 (see Figs. 3, 4, and 9).

The lever 75 having actuating connection with the knife blade carrier 78 is pivoted intermediate its ends on a round portion 90 eccentric to the center line of a shaft having end portions 91 and 92.

End portion 91 is freely rotatable in a block 93 extending at right angles to standard 12 and fixed to block 69 by pins 94 (Fig. 9). End portion 92 is journalled in plate 69 and has fixed thereto a handle 95. When the latter is in the position shown in Fig. 9 in dotted lines, the eccentric round portion 90 is lowered and the lever 75 pivoted thereon is correspondingly lowered thereby disengaging the arcuate gear 76 from the rack 77 on the knife carrier. The latter together with the knife blade may then be removed from the machine for replacement, sharpening, cleaning, or other reasons. When the knife carrier is replaced, the handle 95 may be swung upwardly to the right as viewed in Fig. 9 until a set screw 96 at the free end of the handle is opposite an indentation 97 in the face of plate 69 (see Figs. 1, 3, and 9). The screw 96 may then be turned so that the point thereof will enter the indentation. In this position of the handle, eccentric 90 will be in its highest position and the gear 76 on lever 75 will be in driving engagement with rack 77.

In order to drive the knife evenly and with as little vibration as possible, the parts of the driving assembly heretofore described are balanced on their centers of motion, i. e. the center of gravity of each part is made to coincide with its center of movement. Thus, the portion of lever 75 on one side of the pivot 90 is of the same weight as the portion of the lever on the opposite side of the pivot. Likewise, flywheel 70 and eccentric 71 rigidly attached thereto are balanced equally about the stub shaft 68. The desired balance of the flywheel and eccentric is conveniently obtained by cutting holes 98 in the flywheel. Eccentric sleeve 73 which has an oscillating motion is balanced about its center of motion comprising the shaft 68 while the arm 74 is made symmetrical with respect to the center of shaft 68 to substantially balance the eccentric sleeve 73 and its integral arm about the center of oscillatory motion.

By means of the balancing of the knife drive, an even vibrationless and a substantially noiseless drive is obtained.

A removable housing 99 supported on the base 10 is provided to enclose motor 65 and the driving assembly.

In operation, a piece of meat to be sliced is placed on the table 38 between clamp plate 37 and one of the walls 20 or 21 of the meat chute 19. The index wheel 59 is rotated until the desired thickness of slice to be cut is opposite the index mark 56. The table 38 is thereby adjusted to the necessary height relative to knife 40. The motor switch 100 (Fig. 2) is then turned on to start the motor which drives the gear 76. The latter coacts with rack 77 on the knife carrier 78 to rapidly and noiselessly reciprocate the knife blade 40 in its guides in the top plate 13. The operator with one hand grasps a handle 101 attached to the plate 17 at the right side thereof and beyond the adjacent flange 16 and with the other hand grasps the handle 35 of the meat clamp to keep the meat firmly in position in the meat chute. By pulling on the handle 101 the operator slides the meat chute and plate 17 on which it is fixed towards and past the knife which cuts a slice from the bottom of the piece of meat as it passes onto the top of plate 13. When the operator pushes the meat chute to the rear of the machine after a slice is cut off, the clamp 37 being slidably mounted on post 22 and the meat held thereby is free to move downwardly until the bottom of the meat contacts table 38. The meat holder or chute is moved back and forth until the required number of slices is cut off.

To clamp the end piece of the meat a special end clamp is provided comprising a horizontal pronged plate 105 (Figs. 5 and 6) and a vertical member 106 rigidly joined to the pronged plate. The member 106 has a vertical slot 107 therein fitting over the side plate 21 of the meat chute. The side plate 21 has fixed thereto a pair of strips 108 forming between them a guide slot 109 for restraining the rear portion of member 106 to move vertically.

The end clamp holds the end piece of meat on table 38 and by actuation of handle 101, the meat is moved by the pronged plate 105 relative to the knife. The downward movement of the clamp is limited by the end of slot 107 engaging the top of plate 21.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. The invention therefore is to be limited only as indicated by the scope of the following claims.

I claim:

1. A slicing machine comprising an elongated knife, a frame provided with a guide slot in which the knife is slidably seated, a driving element carried by one end of the knife, a lever for engaging the driving element and adapted to reciprocate the knife, a motor-driven shaft, a disk having a hole off center for receiving the end of the shaft, and a sleeve surrounding the disk and oscillated thereby and having an arm connected to the lever to oscillate the lever, said lever, sleeve, and arm, and disk being each balanced on its center of motion to reduce vibration and noise.

2. A slicing machine comprising a device for feeding an article to be sliced, a frame on which the feeding device is mounted, said frame having therein an elongated guideway, an elongated holder slidable in said guideway, a driving element carried by said holder, a cooperating driving element for driving the holder, an elongated knife carried by said holder for slicing an article fed thereto, and cooperating retaining means on the knife and holder for preventing relative movement of the knife and holder except in a direction transversely to the plane of the holder, in which direction the knife is freely removable from the holder.

3. In a slicing machine, an article holder, an elongated knife blade, a frame having means for mounting the article holder to move towards the knife blade, the article being transversely movable in the holder preparatory to the article reaching the knife blade whereby the latter cuts a slice from the article during aforesaid movement of the holder, a gage device for regulating the transverse movement of the article to determine the thickness of slice cut by the knife blade, said frame having a portion provided with a free longitudinal edge past which the knife blade projects, said portion having a passageway along said edge extending transversely to the direction of aforesaid movement of the holder, a carrier for detachably receiving and supporting the knife blade along its length, the assembled carrier and blade being received in said passageway and the carrier being restrained by the walls of the passageway to slidable movement along the passageway, an actuating element for reciprocating the carrier in the passageway to facilitate the cutting action of the knife blade, and a mounting for said element on which the latter is movable out of cooperation with the carrier to permit the carrier to move independently of the actuating element.

EUGENE A. FORD.